US006654845B1

(12) United States Patent
Morris et al.

(10) Patent No.: US 6,654,845 B1
(45) Date of Patent: Nov. 25, 2003

(54) SYSTEM AND METHOD IMPLEMENTING A SECONDARY BUS TO AVOID READ DATA LATENCY

(75) Inventors: David E. Morris, Lexington, MA (US); Thomas J. Melanson, Revere, MA (US); Christopher Bonni, Bridgewater, MA (US); Kevin P. Frenette, Portsmouth, NH (US); Thomas E. Hirsh, III, Burlington, MA (US); Michael V. Sammarco, Stoughton, MA (US); Frank J. Calabresi, Harvard, MA (US)

(73) Assignee: Intel Corporation, Santa Clara, CA (US)

( * ) Notice: Subject to any disclaimer, the term of this patent is extended or adjusted under 35 U.S.C. 154(b) by 566 days.

(21) Appl. No.: 09/610,964

(22) Filed: Jul. 6, 2000

(51) Int. Cl.$^7$ .......................... G06F 13/00; G06F 13/38; G06F 13/40
(52) U.S. Cl. .............................. 710/305; 710/1; 710/5; 710/20; 710/62; 710/64; 710/72; 710/100
(58) Field of Search .................. 710/1, 5, 8, 10, 710/19, 20, 38, 62, 64, 72, 100, 101, 104, 126, 128, 129, 300, 305, 307; 709/231, 232, 238, 239, 250

(56) References Cited

U.S. PATENT DOCUMENTS

| | | | | |
|---|---|---|---|---|
| 4,245,344 A | * | 1/1981 | Richter | 714/43 |
| 4,535,448 A | * | 8/1985 | Baxter et al. | 370/364 |
| 4,926,415 A | * | 5/1990 | Tawara et al. | 370/231 |
| 4,932,022 A | * | 6/1990 | Keeney et al. | 370/271 |
| 4,982,321 A | * | 1/1991 | Pantry et al. | 710/107 |
| 5,245,322 A | * | 9/1993 | Dinwiddie et al. | 345/629 |
| 5,410,542 A | * | 4/1995 | Gerbehy et al. | 370/364 |
| 5,495,585 A | * | 2/1996 | Datwyler et al. | 710/100 |
| 5,553,249 A | * | 9/1996 | Datwyler et al. | 710/307 |
| 5,557,757 A | * | 9/1996 | Gephardt et al. | 710/306 |
| 5,588,002 A | * | 12/1996 | Kawanishi et al. | 370/462 |
| 5,692,211 A | * | 11/1997 | Gulick et al. | 712/35 |
| 5,734,849 A | * | 3/1998 | Butcher | 710/305 |
| 5,754,807 A | * | 5/1998 | Lambrecht et al. | 710/308 |
| 5,784,592 A | * | 7/1998 | Gulick et al. | 710/300 |
| 5,822,613 A | * | 10/1998 | Takaki et al. | 710/7 |
| 5,889,959 A | * | 3/1999 | Whittaker et al. | 709/232 |
| 6,430,637 B1 | * | 8/2002 | Larson | 710/307 |
| 6,502,203 B2 | * | 12/2002 | Barron et al. | 714/4 |

* cited by examiner

Primary Examiner—Kim Huynh
Assistant Examiner—Tanh Q Nguyen
(74) Attorney, Agent, or Firm—Pillsbury Winthrop LLP (57) ABSTRACT

A system and method that enhances overall computer system performance by implementing a secondary bus infrastructure to avoid data phase transaction latencies during primary bus information transfers. In accordance with an embodiment of the invention, the system includes a first bus, coupled to a host adapter and a plurality of media adapters, and a second bus, coupled to the host adapter and a select number of media adapters. The host adapter includes a host first bus controller, coupled to the first bus, and a host second bus controller, coupled to the second bus. Each of the media adapters contain a media first bus controller, coupled to the first bus, and a select number of media adapters contain a media second bus controller, coupled to the second bus. In this configuration, information initiated as a multiple data phase transaction is transferred between the host adapter and media adapters over the first bus and information initiated as a single data phase transaction is transferred between the host adapter and the select number of media adapters over the second bus.

29 Claims, 5 Drawing Sheets

SYSTEM AND METHOD IMPLEMENTING A SECONDARY BUS TO AVOID READ DATA LATENCY

BACKGROUND OF THE INVENTION

1. Field of the Invention

This invention relates to the transfer of information in computer systems. Specifically, this invention relates to a novel system and method that enhances overall computer system performance by implementing a secondary bus infrastructure to avoid data phase transaction latencies during information transfers.

2. Description of Related Art and General Background

Figure 1:
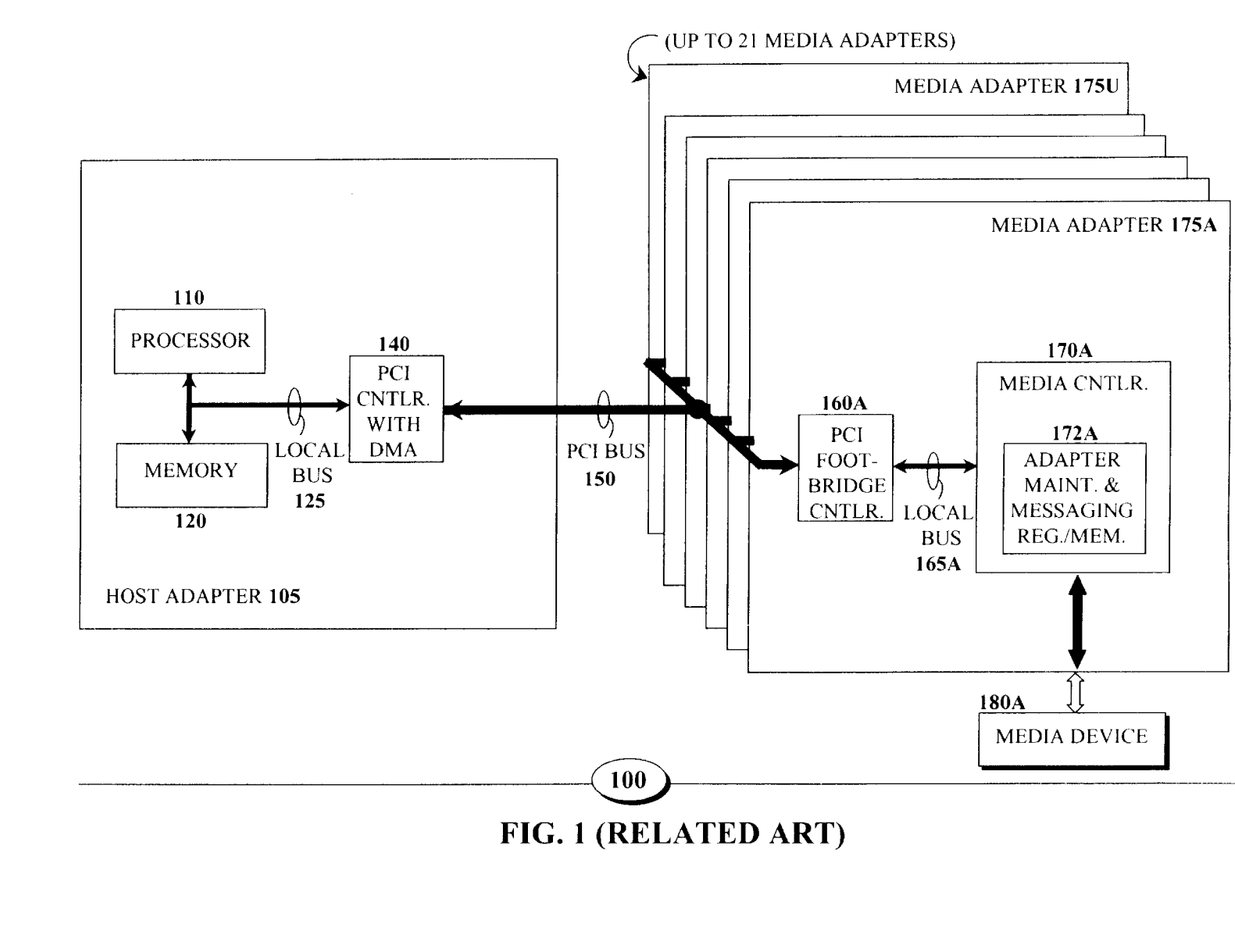
FIG. 1 depicts a functional block diagram of a computer system, including a host adapter and media adapters.

As indicated in FIG. 1, conventional computer system 100 comprises a host adapter 105 and a plurality of media adapters 175A–175U. The number of media adapters 175A–175U may be limited by system 100 configuration and system bus infrastructure 150 (e.g., 21 adapters for PCI configuration). Host adapter 105 includes processor 110 and memory 120. Processor 110 may comprise one or more microprocessors, for example, and includes system controller functionality to supervise and control the various components of system 100. Memory 120 may comprise semiconductor memory, such as, read-only memory (ROM) and/or random-access memory (RAM), arranged in one or more hierarchical levels (e.g. Level-1 cache, Level-2 cache, main memory, Basic Input/Output System (BIOS), etc.).

System 100 supports the input of information from, and/or the output of information to, one or more peripheral media devices 180A–180U through media controllers 170A–170U. Examples of such devices 180A–180U include video displays, keyboards, printers, devices for input and/or output of audio and video, network interfaces, and secondary storage media (i.e., disk drives, tape drives), etc. Such media devices 180A–180U may be coupled to media adapters 175A–175U, via media controllers 170A–170U, which communicate with processor 110 and/or memory 120 via system bus infrastructure 150. System bus 150 may be configured as a Peripheral Connect Interface (PCI) bus, as defined by PCI Bus Specification, Rev. 2.2, PCI Special Interest Group, Hillsboro, Oreg.

PCI is a high-speed interconnection system that accommodates data transfer between processor 110, host adapter 105 components, and media adapter 175$i$ components. As indicated in FIG. 1, data transfers are conveyed over system bus 150 (e.g., PCI bus 150), which defines a connection path between a host PCI controller 140 and a media PCI controller 160$i$. Host PCI controller 140 and media PCI controller 160$i$ serve to isolate system bus 150 from the host local bus 125 and media local bus 165$i$. Moreover, PCI may incorporate Direct Memory Access (DMA) functionality to accommodate the data transfer between a media device 180$i$ to the host adapter memory 120, in order to free processor 110 from data transfer involvement and speed up overall computer performance. PCI implements DMA by utilizing bus-mastering techniques to delegate input/output (I/O) control to host PCI controller 140 and media PCI controller 160$i$.

PCI is capable of transmitting both, address and data signals, 32 bits or 64 bits at a time across the connection path. For example, the transfer of information may be initiated as a single data phase transaction, in which a read or write address is transmitted over one clock cycle and a corresponding data unit is transmitted over a subsequent cycle. Alternatively, transfers may be initiated as a multiple (i.e., "bursty") data phase transactions, in which the read or write address is transmitted over one clock cycle and a plurality of data units is transmitted over a predetermined number of successive cycles. Because of the use of one address per multiple data units, multiple data phase transactions provide a more efficient use of the PCI bus 150 bandwidth than single data phase transactions. It is important to note that, when targeted for a data transaction, each media adapter 175$i$ may possess a different delay based on the manner in which they respond to data requests. In other words, each media adapter 175$i$ may require the passage of a predetermined number of clock cycles (e.g., up to 16 clock cycles) between the address clock cycle and the subsequent initial data cycle during a target read. This passage of predetermined clock cycles germane to each media adapter 175$i$ is referred to "initial data phase latency".

During normal information transfers between media adapters 175A–115U, transfers are typically conveyed over system bus 150 and are initiated as multiple data phase transactions, where initial data phase latencies comprise a negligible portion of the entire transaction interval. Media adapters 175A–175U may also require maintenance/message information transfers, performed as single data phase transactions, in which processor 110 accesses maintenance/messaging information from media controller 170$i$ to ascertain and/or provide local configuration, command, management, and status information. Because, as noted above, single data phase transactions only transfer one data unit per clock cycle and because different media adapters 175A–175U may respond slower than others, single data phase transactions are particularly susceptible to the effects of initial data phase latencies. As such, the mixture of single data phase transactions and multiple data phase transactions over the same system bus 150, can have a deleterious effect on system performance (e.g., reducing theoretical system bus performance from 132 MBps to 13.2 MBps on a 32-bit PCI bus, assuming 10 single data phase maintenance/management transactions for every 1500 byte media adapter DMA data transfer). Therefore, what is needed is a system and method that avoids such data phase transaction latencies during information transfers to improve overall computer system performance.

DETAILED DESCRIPTION OF THE INVENTION

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein.

A computer system that avoids single data phase latencies during information transfers, as described herein, implements a secondary bus infrastructure to accommodate single data phase traffic. The host adapter interfaces with the secondary bus via a secondary bus initiator, which routes single data phase traffic to, and receives single data phase traffic from, the secondary bus. Media adapters interface with the secondary bus via a secondary bus controller, which routes single data phase traffic to, and receives single data phase traffic from, the secondary bus. Multiple data phase traffic is routed through the conventional (primary) system bus. In this manner, single data phase traffic with its susceptibility to data phase latencies, is routed on a separate bus infrastructure than is the multiple data phase traffic. As such, computer system performance is enhanced.

Figure 2:
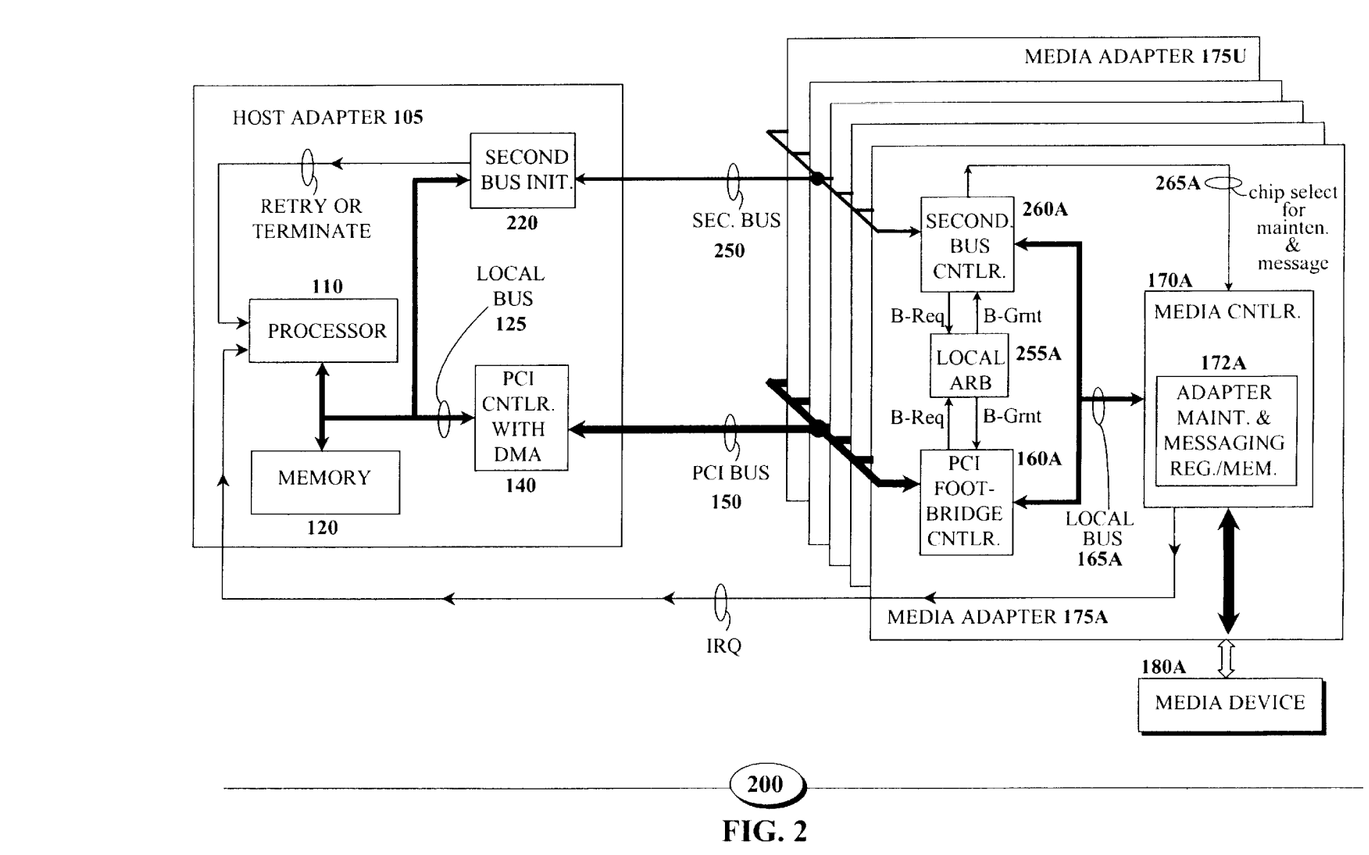
FIG. 2 shows a functional block diagram of a computer system, consistent with an embodiment of the present invention.
Figure 3A:
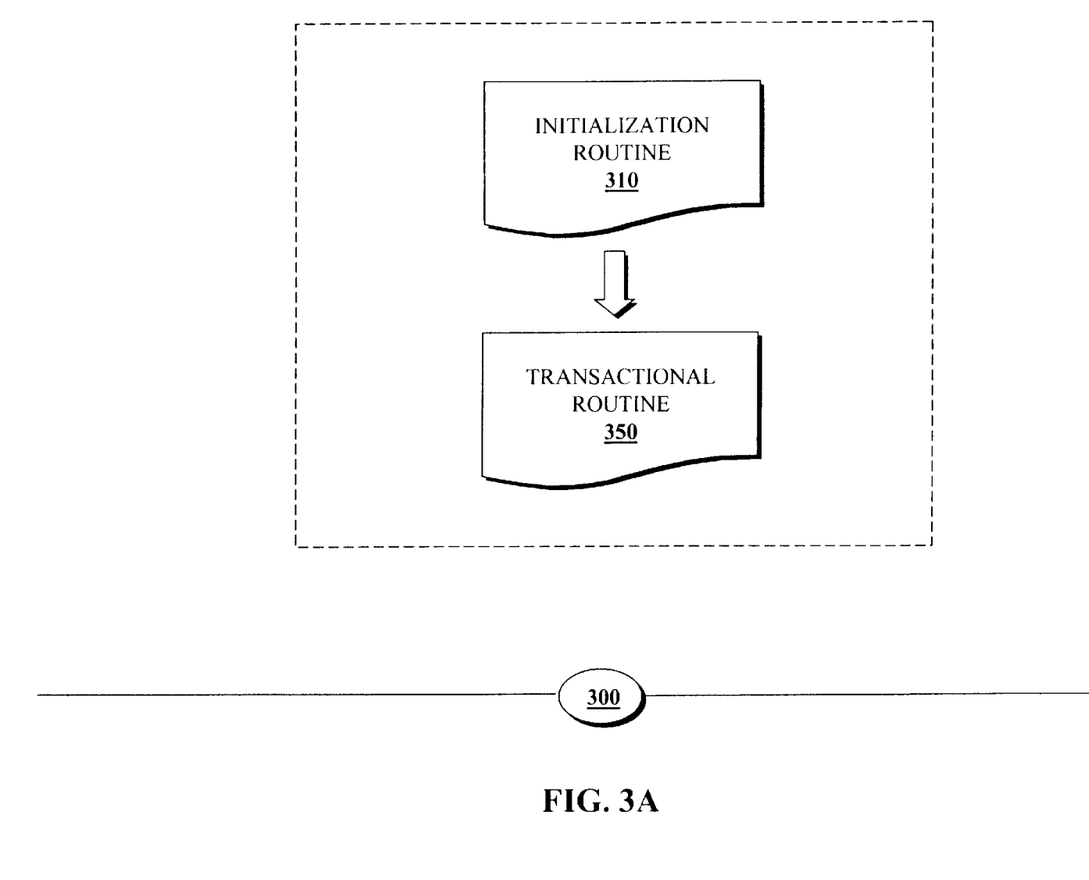
FIGS. 3A–3C depict high-level flow diagrams, consistent with an embodiment of the present invention.

FIGS. 2 and 3A–3C illustrate system 200 and process 300, respectively, which are constructed and operative in accordance with an embodiment of the present invention. FIG. 2 is a functional block diagram depicting system 200, which comprises a secondary bus infrastructure 250, a secondary bus initiator 220, and a secondary bus target 260i for each media adapter 175i. It is to be noted that, while a plurality of media adapters 175A–U and their associated components are referenced with suffixes A and U in FIGS. 1–2, for notation purposes, the suffix i will be used in this description to indicate a particular adapter or component from the set of adapters or components A–U. FIG. 3A depicts a high-level flow diagram illustrating process 300, which comprises initialization routine 310 and transactional routine 350. Process 300 may be stored in any storage device, such as, for example, a computer system (non-volatile) memory, an optical disk, magnetic tape, or magnetic disk. Furthermore, process 300 may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

As indicated in FIG. 2, system 200 includes a secondary bus infrastructure 250, which interconnects host adapter 105 with each media adapter 175i to accommodate the transfer of single data phase transactions, such as maintenance/messaging information. FIG. 2 also includes host adapter controller 140, system bus 150, and media adapter controller 160i, as noted above and depicted in FIG. 1, to accommodate the transfer of multiple data phase transactions.

During write transactions, host adapter 105 directs maintenance/messaging information to a target media adapter 175i. The information originating from host processor 110 is posted, and acknowledged by, secondary bus initiator 220 via local bus 125. Secondary bus initiator 220, also referred to as a host adapter secondary bus controller, is configured to communicate with host local bus 125 as well as the secondary bus controller 260i associated with target media adapter 175i.

To reduce backplane complexity, secondary bus 250 may be configured for serial transmission, requiring only a clock line and a serial data line. The serial data line may convey the maintenance/messaging information while the clock line synchronizes the information. During posted write transactions, when maintenance/messaging information is directed from host processor 110 to media adapter 175i, secondary bus initiator 220 may assemble the information in accordance with the following format: [target adapter ID/R-W-bit/length/target data address/data/parity or CRC]; where target adapter ID identifies the target media adapter 175i in which the information is to be written to; R-W-bit indicates that the information is for a write operation; length indicates the overall length of the message (e.g., in bytes); target data address indicates the memory location of data to be written to; data is the messaging and maintenance information; and parity or CRC provides error checking capabilities to the data.

Returning to FIG. 2, during write transactions, the maintenance/messaging traffic is conveyed to secondary bus controller 260i of target media adapter 175i via by secondary bus 250. Secondary bus controller 260i disassembles the maintenance/messaging information and stores the information in temporary buffers within controller 260i. Secondary bus controller 260i then requests access to local bus 165i of target media adapter 175i by submitting a bus access request (B-Req) to local arbitration unit 255i. If local bus 165i is capable of accommodating the maintenance/messaging traffic, local arbitration unit 255i grants access by returning an acknowledgment (B-Grnt) back to secondary bus controller 260i. Secondary bus controller 260i then forwards the traffic to media controller 170i of target media adapter 175i.

Moreover, to relieve local bus 165i from conveying control information, the addressing portion of the maintenance/messaging information may be decoded through chip select lines connected to media controller 170i. For example, as indicated in FIG. 2, secondary bus controller 260i may decode the addressing information across chip select lines 265i to select the corresponding register or memory locations within the adapter maintenance and message portion 172i of media controller 170i.

In performing read transactions, maintenance/messaging information is generally directed from media adapter 175i to host processor 110. However, before media adapter 175i sends any information to host processor 110, processor 110 first initiates a read maintenance/message data transaction request to media controller 170i of target media adapter 175i. The corresponding data is conveyed in serial format, as noted above, with the R-W field set to read.

In response to the read maintenance/message request, secondary bus initiator 220 initially submits a "retry" message to host processor 110, to signify that it has not received the requested read information from target media adapter 175i. In addition, secondary bus initiator 220 will relay the read maintenance/message request to the secondary bus controller 260i of target media adapter 175i. Host processor 110 typically retries the read transaction immediately. Secondary bus initiator 220 will continue to submit a retry message to host processor 110 until it has received either (1) the requested read information from target media adapter 175i or (2) a terminate read transaction message from target media adapter 175i.

The read transaction is consummated over secondary bus 250. Specifically, secondary bus controller 260i decodes read maintenance/message request and forwards the request to target media controller 170i of target media adapter 175i.

In response to the read maintenance/message request, target media controller 170*i* routes the requested read maintenance/message information to secondary bus controller 260*i* via local bus 165*i*. Secondary bus controller 260*i* then conveys the requested read maintenance/message information to secondary bus initiator 220 via secondary bus 250. During the reply to read transaction, the requested read maintenance/message information may be assembled by secondary bus controller 260*i* in accordance with the following format: [host adapter ID/R-W-bit/length/target data address/data/parity or CRC]; where host adapter ID identifies host adapter 105 in which the information is to being responded to; R-W-bit indicates that the information is for a read transaction; length indicates the overall length of the transmitted message; target data address indicates the target media adapter address; data is the read messaging and maintenance information; and parity or CRC provides error checking capabilities to the data.

The requested maintenance/messaging information read from target adapter 165*i* is then received by secondary bus initiator 220 of host adapter 105, where the information is disassembled and held in a dedicated queue within secondary bus initiator 220. Instead of responding with a retry message when processor 110 attempts (i.e., retries) the read maintenance/message request, secondary bus initiator 220 responds with an acknowledgment to processor 110, indicating that the requested information will be furnished. The dedicated queue presents the requested information to the local bus 125, where the requested information is finally routed to processor 110 via local bus 125.

FIG. 3A illustrates process 300, operative and constructed in accordance with an embodiment of the present invention. Process 300 comprises initialization routine 310 and transactional routine 350. In an exemplary implementation, host processor 110 executes initialization routine 310 during the booting-up process of system 200 while host processor 110 executes transactional routine 350 during the information transfer operations of system 200.

Figure 3B:
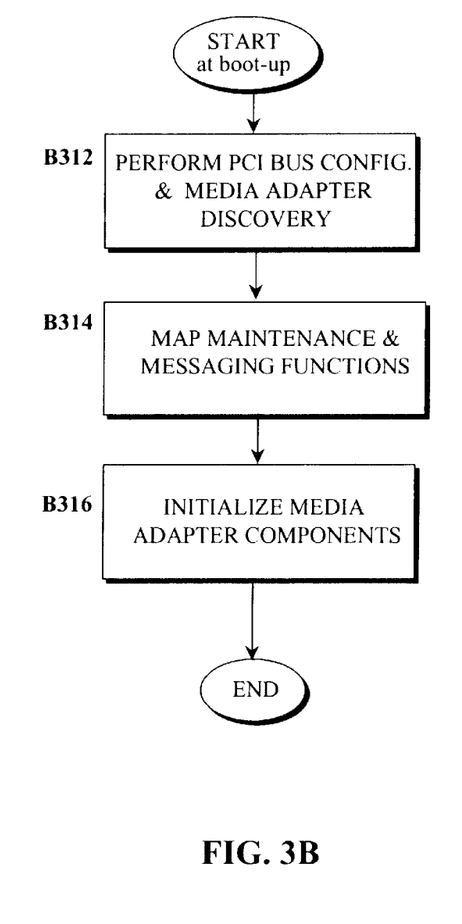

FIG. 3B depicts initialization routine 310, which initializes the various components of system 200. As indicated in block B312, routine 310 performs PCI bus 150 configuration and media adapter discovery to identify media adapters 175A–175U. This is achieved by accessing, via PCI bus 150, PCI configuration registers located within the PCI controllers (e.g., foot-bridge) 160*i* of each media adapter 175*i* to gain adapter information, such as, for example, device and vendor code information. The device and vendor code information reveal details of the components of adapter 175*i*, including whether adapter 175*i* contains a secondary bus target 260*i* to interface with secondary bus 250.

After accessing, and extracting information from, media adapters 175A–175U, block B314 of routine 310 maps maintenance/messaging functions to the secondary bus 250 for each of the media adapters 175*i* having secondary bus target 260*i* capabilities, as determined in block B312. The maintenance/messaging functions are retrieved from the PCI configuration registers of PCI controllers 160*i* and include media adapter 175*i* information, such as local bus configuration, command information, management information, and status information.

Finally, in block B316, routine 310 initializes the components of all media adapters 175A–175U, including those adapters lacking secondary bus target 260*i* capabilities.

Figure 3C:
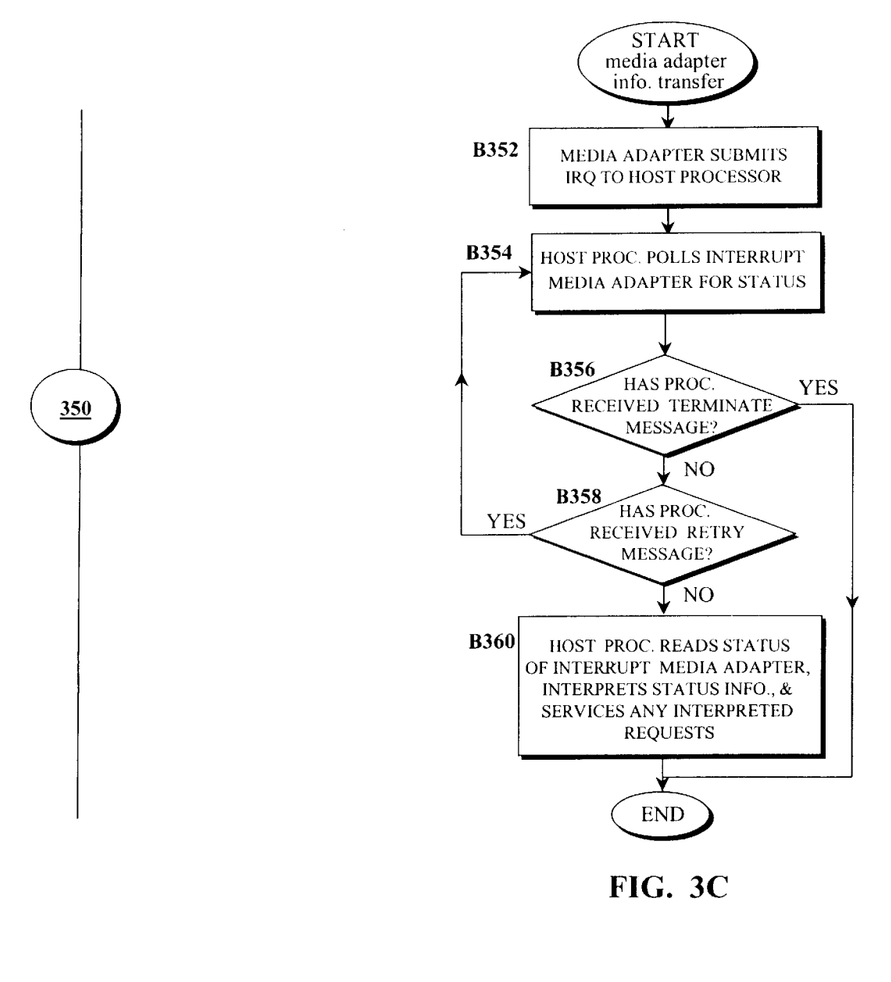

FIG. 3C depicts transactional routine 350, which, as noted above, is executed by host processor 110 during the information transfer operations of system 200. To initiate an information transfer, media adapter 175*i*, in block B352, submits an interrupt request (IRQ) message to processor 110 of host adapter 105, indicating the need for maintenance/message service.

In block B354, host processor 110 polls the interrupting media adapter 175*i* for status information. Polling is executed as a read transaction with the polling status message being read over secondary bus 250, using the secondary bus information transfer technique indicated above. Moreover, as noted above, host processor 110 will retry read transactions to secondary bus initiator 220 until initiator 220 indicates that it is either (1) ready to transfer information to processor 110 (i.e., secondary bus initiator 220 has received and queued the information from media adapter 175*i*) or (2) it has received a terminate read transaction message from media adapter 175*i* (i.e., the read transaction was terminated by media adapter 175*i*). Specifically, routine 350, in block B356, determines whether host processor 110 has received a terminate read transaction message from interrupting media adapter 175*i*. If not, routine 350 advances to block B358. If host processor 110 has received a terminate read transaction message, routine 350 progresses to block B362, where interrupting media adapter 175*i* gets serviced.

In block B358, routine 350 determines whether host processor 110 is receiving a retry message from secondary bus initiator 220. If not, routine 350 advances to block B360. If host processor 110 is receiving a retry message, routine 350 returns to block B354, where processor 110 continues to poll interrupting media adapter 175*i* for status information.

If host processor 110 has not received a terminate message or retry message, routine 350 determines that interrupting media adapter 175*i* has correctly responded to the polling status message with status information. Accordingly, host processor 110, in block B360, reads the status information of interrupting media adapter 175I, interprets the information, and services any interpreted requests.

The foregoing description of the preferred embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

Note that instead of using a secondary bus configured as a serial bus, other configurations are possible. Moreover, although the invention is described principally in terms of a PCI system bus, the invention may be practiced with other system bus configurations without compromising the efficacy of the invention. As such, the present invention is not intended to be limited to the embodiments shown above but rather is to be accorded the widest scope consistent with the principles and novel features disclosed in any fashion herein.

What is claimed is:

1. A computer comprising:
   a first bus;
   a second bus;
   a host adapter including a host adapter first bus controller coupled to said first bus and a host adapter second bus controller coupled to said second bus;

a plurality of media adapters, each of said media adapters having a media adapter first bus controller coupled to said first bus and select ones of said media adapters having a media adapter second bus controller coupled to said second bus;

wherein the first bus, the second bus, the host adapter, and the plurality of media adapters are contained within a computer housing, and information initiated as a multiple data phase transaction is transferred between said host adapter and said media adapters over said first bus and information initiated as a single data phase transaction is transferred between said host adapter and said select ones of media adapters over said second bus.

2. The computer of claim 1, wherein said single data phase transaction information includes maintenance and messaging information, said maintenance and messaging information including at least one of host adapter message information, media adapter message information, media adapter maintenance information, media adapter configuration information, command information, management information, status information, terminate information, and retry information.

3. The computer of claim 2, wherein said host adapter further includes, a host adapter processor, a host adapter memory, and a host adapter local bus, coupled to said host adapter processor, said host adapter memory, and said host adapter first bus controller, to accommodate transfer of information between said host adapter processor, said host adapter memory, and said host adapter first bus controller.

4. The computer of claim 3, wherein said select ones of said media adapters include, a maintenance and messaging device containing maintenance and message registers, and a media adapter local bus, coupled to said media adapter first bus controller, said media adapter second bus controller, and said maintenance and messaging device to accommodate transfer of information between said media adapter first bus controller, said media adapter second bus controller, and said maintenance and messaging device.

5. The computer of claim 4, wherein said select ones of said media adapters include, a media adapter arbitration unit, coupled to said media adapter first bus controller and said media adapter second bus controller, to process and arbitrate requests for the use of said media adapter local bus from said media adapter first bus controller and said media adapter second bus controller.

6. The computer of claim 5, wherein said second bus is configured as a serial bus comprising, a serial data channel to accommodate said single data phase transaction information, and a clocking channel synchronized to said single data phase transaction information.

7. The computer of claim 6, wherein said first bus is configured as a Peripheral Component Interconnect (PCI) bus.

8. The computer of claim 7, wherein said host adapter second bus controller of said host adapter assembles said single data phase transaction information transferred from said host adapter to said select ones of said media adapter in a format that includes, target adapter information to identify which of said select media adapters said single data phase transaction information is to be written to, write transaction information to indicate that said single data phase transaction information is for a write transaction, length information to indicate an overall length information to be transmitted, target address information to indicate a memory location of data to be written to, data portion to contain the information to be transmitted, and parity information to provide error checking capabilities.

9. The computer of claim 8, wherein said media adapter second bus controller of said select ones of said media adapters assembles said single data phase transaction information transferred from said select ones of said media adapters to said host adapter in a format that includes, host adapter information to identify said host adapter in which said single data phase transaction information is being responded to, read transaction information to indicate that said single data phase transaction information is for a read transaction, length information to indicate the overall length of the information to be transmitted, target address information to indicate said target media adapter address read from, data portion to contain the information to be transmitted, and parity information to provide error checking capabilities.

10. A method comprising:

configuring a first bus, coupled to a host adapter and a plurality of media adapters in a computer during a booting-up process, said configuring including accessing said plurality of media adapters to determine media adapter information;

mapping maintenance and messaging capabilities to a second bus, said second bus coupled to said host adapter and select ones of said media adapters;

configuring said media adapters, based on said adapter information; and transferring information between said host adapter, said media adapters, and said select ones of media adapters over at least one of said first and second bus, wherein the first bus, the second bus, the host adapter, and the plurality of media adapters are contained within a computer housing, and information initiated as a multiple data phase transaction is transferred between said host adapter and said media adapters over said first bus and information initiated as a single data phase transaction is transferred between said host adapter and said select ones of media adapters over said second bus.

11. The method of claim 10, wherein said single data phase transaction information includes maintenance and messaging information, said maintenance and messaging information including at least one of host adapter message information, media adapter message information, media adapter maintenance information, media adapter configuration information, command information, management information, status information, terminate information, and retry information.

12. The method of claim 11, wherein said host adapter further includes, a host adapter processor, a host adapter memory, a host adapter first bus controller coupled to said first bus, a host adapter second bus controller coupled to said second bus, a host adapter local bus, coupled to said host adapter processor, said host adapter memory, and said host adapter first bus controller, to accommodate said transferring of information.

13. The method of claim 12, wherein said select ones of said media adapters include, a media adapter first bus controller, a media adapter second bus controller, a maintenance and messaging device, and a media adapter local bus, coupled to said media adapter first bus controller, said media adapter second bus controller, and said maintenance and messaging device to accommodate said transferring of information.

14. The method of claim 13, wherein said transferring of information further includes, submitting an interrupt request, by at least one interrupting media adapter of said select ones of media adapters to said host adapter processor, to indicate a need for maintenance and messaging service, polling, by said host adapter processor, status information of said interrupting media adapter, receiving, by said host adapter processor, messages submitted by said interrupting media adapter in response to said polling, said messages including at least one of status messages, terminate messages, and retry messages, reading, by said host adapter processor, status information of said interrupting media adapter submitting status messages, interpreting, by said host adapter processor, status information of said interrupting media adapter, and servicing, by said host adapter processor, said interrupting media adapter based on requests interpreted from said status information.

15. The method of claim 14, further including, re-polling, by said host adapter processor, status of said interrupting media adapter when said interrupting media adapter submits retry messages, and terminating polling, by said host adapter processor, of said interrupting media adapter when said interrupting media adapter submits terminate messages.

16. The method of claim 15, further including, arbitrating and processing requests to use said media adapter local bus for said transferring of information, wherein said requests are generated by said media adapter first bus controller and said media adapter second bus controller.

17. The method of claim 16, wherein said first bus is configured as a Peripheral Component Interconnect (PCI) bus and said second bus is configured as a serial bus comprising a serial data channel, to accommodate said single data phase transaction information, and a clocking channel synchronized to said single data phase transaction information.

18. The method of claim 17, wherein said host adapter second bus controller of said host adapter assembles said single data phase transaction information transferred from said host adapter to said select ones of said media adapter in a format that includes, target adapter information to identify which of said select media adapters said single data phase transaction information is to be written to, write transaction information to indicate that said single data phase transaction information is for a write transaction, length information to indicate the overall length information to be transmitted, target address information to indicate a memory location of data to be written to, data portion to contain the information to be transmitted, and parity information to provide error checking capabilities.

19. The method of claim 18, wherein said media adapter second bus controller of said select ones of said media adapter assembles said single data phase transaction information transferred from said select ones of said media adapters to said host adapter in a format that includes, host adapter information to identify said host adapter in which said single data phase transaction information is being responded to, read transaction information to indicate that said single data phase transaction information is for a read transaction, length information to indicate the overall length of the information to be transmitted, target address information to indicate said target media adapter address read from, data portion to contain the information to be transmitted, and parity information to provide error checking capabilities.

20. A computer-readable medium encoded with a plurality of processor-executable instruction sequences for:

configuring a first bus, coupled to a host adapter and a plurality of media adapters in a computer during a booting-up process, said configuring including accessing said plurality of media adapters to determine media adapter information;

mapping maintenance and messaging capabilities to a second bus, said second bus coupled to said host adapter and select ones of said media adapters;

configuring said media adapters, based on said adapter information; and transferring information between said host adapter, said media adapters, and said select ones of media adapters over at least one of said first and second bus, wherein the first bus, the second bus, the host adapter, and the plurality of media adapters are contained within a computer housing, and information initiated as a multiple data phase transaction is transferred between said host adapter and said media adapters over said first bus and information initiated as a single data phase transaction is transferred between said host adapter and said select ones of media adapters over said second bus.

21. The computer-readable medium of claim 20, wherein said single data phase transaction information includes maintenance and messaging information, said maintenance and messaging information including at least one of host adapter message information, media adapter message information, media adapter maintenance information, media adapter configuration information, command information, management information, status information, terminate information, and retry information.

22. The computer-readable medium of claim 21, wherein said host adapter further includes, a host adapter processor, a host adapter memory, a host adapter first bus controller coupled to said first bus, a host adapter second bus controller coupled to said second bus, a host adapter local bus, coupled to said host adapter processor, said host adapter memory, and said host adapter first bus controller, to accommodate said transferring of information.

23. The computer-readable medium of claim 22, wherein said select ones of said media adapters include, a media adapter first bus controller, a media adapter second bus controller, a maintenance and messaging device, and a media adapter local bus, coupled to said media adapter first bus controller, said media adapter second bus controller, and said maintenance and messaging device to accommodate said transferring of information.

24. The computer-readable medium of claim 23, wherein said transferring of information further includes, submitting an interrupt request, by at least one of said select ones of media adapters to said host adapter processor, to indicate a need for maintenance and messaging service, polling, by said host adapter processor, status information of said interrupting media adapter, receiving, by said host adapter processor, messages submitted by said interrupting media adapter in response to said polling, said messages including at least one of status messages, terminate messages, and retry messages, reading, by said host adapter processor, status information of interrupting media adapter submitting status messages, interpreting, by said host adapter processor, status information of interrupting media adapter, and servicing, by said host adapter processor, said interrupting media adapter based on requests interpreted from said status information.

25. The computer-readable medium of claim 24, further including, re-polling, by said host adapter processor, status of said interrupting media adapter when said interrupting media adapter submits retry messages, and terminating polling, by said host adapter processor, of said interrupting media adapter when said interrupting media adapter submits terminate messages.

26. The computer-readable medium of claim 25, further including, arbitrating and processing requests to use said media adapter local bus for said transferring of information, wherein said requests are generated by said media adapter first bus controller and said media adapter second bus controller.

27. The computer-readable medium of claim 26, wherein said first bus is configured as a Peripheral Component Interconnect (PCI) bus and said second bus is configured as a serial bus comprising a serial data channel, to accommodate said single data phase transaction information, and a clocking channel synchronized to said single data phase transaction information.

28. The computer-readable medium of claim 27, wherein said host adapter second bus controller of said host adapter assembles said single data phase transaction information transferred from said host adapter to said select ones of said media adapter in a format that includes, target adapter information to identify which of said select media adapters said single data phase transaction information is to be written to, write transaction information to indicate that said single data phase transaction information is for a write transaction, length information to indicate the overall length information to be transmitted, target address information to indicate a memory location of data to be written to, data portion to contain the information to be transmitted, and parity information to provide error checking capabilities.

29. The computer-readable of claim 28, wherein said media adapter second bus controller of said select ones of said media adapter assembles said single data phase transaction information transferred from said select ones of said media adapters to said host adapter in a format that includes, host adapter information to identify said host adapter in which said single data phase transaction information is being responded to, read transaction information to indicate that said single data phase transaction information is for a read transaction, length information to indicate the overall length of the information to be transmitted, target address information to indicate said target media adapter address read from, data portion to contain the information to be transmitted, and parity information to provide error checking capabilities.

* * * * *